United States Patent
Norair (10) Patent No.: US 9,414,342 B2
(45) Date of Patent: *Aug. 9, 2016

(54) METHOD AND APPARATUS FOR QUERY-BASED CONGESTION CONTROL

(71) Applicant: Blackbird Technology Holdings, Inc., Dover, DE (US)

(72) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,178

(22) Filed: Nov. 10, 2014

(65) Prior Publication Data

US 2015/0146538 A1    May 28, 2015

Related U.S. Application Data (63) Continuation of application No. 13/408,464, filed on Feb. 29, 2012, now Pat. No. 8,885,586.

(60) Provisional application No. 61/464,376, filed on Mar. 2, 2011.

(51) Int. Cl.
*H04W 72/12* (2009.01)
*H04W 56/00* (2009.01)
(Continued)

(52) U.S. Cl.
CPC ........... *H04W 56/001* (2013.01); *H04B 17/318* (2015.01); *H04L 1/0061* (2013.01);
(Continued)

(58) Field of Classification Search
CPC . H04L 1/0061; H04L 1/0083; H04L 43/0847; H04L 43/16; H04L 47/12; H04L 47/822; H04L 69/22; H04L 12/413; H04W 56/0025; H04W 74/04; H04W 72/12; H04W 74/0808; H04W 74/08

USPC ................. 370/338, 431, 445, 447, 458–459, 370/461–462; 455/450, 451, 452.1, 464
See application file for complete search history.

(56) References Cited

U.S. PATENT DOCUMENTS 5,338,625 A    8/1994 Bates
5,615,366 A    3/1997 Hansen
(Continued)

FOREIGN PATENT DOCUMENTS

EP    1321009 B1    1/2007
JP    2009/010449 A    1/2009
(Continued)

OTHER PUBLICATIONS

PCT International Searching Authority, Notification Concerning Transmittal of the International Search Report and The Written Opinion of the International Searching Authority, or the Declaration, in International application No. PCT/US2011/55118, dated Feb. 28, 2012. (25 pages).
(Continued)

*Primary Examiner* — Mohamed Kamara
(74) *Attorney, Agent, or Firm* — McAndrews, Held & Malloy, Ltd.

(57) ABSTRACT

An electronic device may be operable to communicate over a physical medium and to regulate the transmission of a message onto the physical medium. The device may access the medium in accordance with a CSMA scheme, wherein one or more values of one or more CSMA parameters may be determined based on the result of a comparison of a received search token to data stored in the communication device. The message may be a response to a received request message, and the search token may have been received in the request message. A value of the CSMA parameter(s) may be determined based on the result of a comparison of the score and one or more thresholds. The threshold(s) may have been received in the request message. The value(s) of the CSMA parameter(s) may be determined based on one or more initial values contained in the received request message.

14 Claims, 8 Drawing Sheets

(51) Int. Cl.
*H04L 29/06* (2006.01)
*H04L 1/00* (2006.01)
*H04L 12/26* (2006.01)
*H04L 12/801* (2013.01)
*H04L 12/911* (2013.01)
*H04W 52/36* (2009.01)
*H04B 17/318* (2015.01)
*H04W 72/04* (2009.01)
*H04W 52/24* (2009.01)

(52) U.S. Cl.
CPC ............ *H04L43/0847* (2013.01); *H04L 43/16* (2013.01); *H04L 47/12* (2013.01); *H04L 47/822* (2013.01); *H04L 69/22* (2013.01); *H04W 52/36* (2013.01); *H04W 56/0025* (2013.01); *H04W 72/0446* (2013.01); *H04L 1/0083* (2013.01); *H04W 52/242* (2013.01)

(56) References Cited

U.S. PATENT DOCUMENTS

| | | |
|---|---|---|
| 5,729,557 A | 3/1998 | Gardner et al. |
| 5,959,281 A | 9/1999 | Domiteaux |
| 6,115,379 A | 9/2000 | Flanders et al. |
| 6,307,846 B1 | 10/2001 | Willey |
| 6,330,700 B1 | 12/2001 | Morris |
| 6,356,442 B1 | 3/2002 | Lunsford |
| 6,381,243 B1 | 4/2002 | Ekstedt |
| 6,388,997 B1 | 5/2002 | Scott |
| 6,424,301 B1 | 7/2002 | Johnson |
| 6,452,569 B1 | 9/2002 | Park |
| 6,525,928 B1 | 2/2003 | Madsen |
| 6,549,959 B1 | 4/2003 | Yates |
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 6,791,996 B1 * | 9/2004 | Watanabe ............ H04W 74/02 370/347 |
| 7,009,941 B1 | 3/2006 | Uchino |
| 7,072,431 B2 | 7/2006 | Wang |
| 7,233,603 B2 | 6/2007 | Lee |
| 7,280,555 B2 | 10/2007 | Stanforth |
| 7,292,548 B2 | 11/2007 | Lim |
| 7,293,088 B2 | 11/2007 | Douglas |
| 7,305,237 B2 | 12/2007 | Stephens |
| 7,308,103 B2 | 12/2007 | Corcoran et al. |
| 7,315,248 B2 | 1/2008 | Egbert |
| 7,330,446 B2 | 2/2008 | Lee |
| 7,369,512 B1 | 5/2008 | Shurbanov et al. |
| 7,554,981 B2 | 6/2009 | Kecskemeti |
| 7,580,397 B2 | 8/2009 | Arai |
| 7,606,256 B2 | 10/2009 | Vitebsky |
| 7,643,509 B2 | 1/2010 | Han |
| 7,663,878 B2 | 2/2010 | Swan |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,760,689 B2 | 7/2010 | Shin |
| 7,805,129 B1 | 9/2010 | Issa |
| 7,814,107 B1 | 10/2010 | Thirumalai |
| 7,890,839 B2 | 2/2011 | Iwami |
| 7,941,197 B2 | 5/2011 | Jain |
| 7,962,361 B2 | 6/2011 | Ramchandani |
| 8,035,488 B2 | 10/2011 | Shiotsu |
| 8,036,715 B2 | 10/2011 | Buck |
| 8,325,665 B2 | 12/2012 | Kim |
| 8,340,796 B2 | 12/2012 | Stefik |
| 8,351,409 B2 | 1/2013 | Albert |
| 8,483,196 B2 | 7/2013 | Wang |
| 8,554,271 B2 | 10/2013 | Wang |
| 8,599,687 B1 | 12/2013 | Kleyman |
| 8,718,551 B2 | 5/2014 | Norair |
| 8,774,096 B2 | 7/2014 | Norair |
| 8,867,370 B2 | 10/2014 | Norair |
| 8,885,586 B2 | 11/2014 | Norair |
| 8,909,865 B2 | 12/2014 | Norair |
| 8,929,961 B2 | 1/2015 | Norair |
| 2002/0022495 A1 | 2/2002 | Choi |
| 2002/0025823 A1 | 2/2002 | Hara |
| 2002/0078045 A1 | 6/2002 | Dutta |
| 2002/0108045 A1 | 8/2002 | Wells |
| 2003/0115369 A1 | 6/2003 | Walter |
| 2003/0128674 A1 | 7/2003 | Kong |
| 2003/0154243 A1 | 8/2003 | Crockett |
| 2003/0183691 A1 | 10/2003 | Lahteenmaki |
| 2003/0214905 A1 * | 11/2003 | Solomon ............... H04L 1/0026 370/229 |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0138178 A1 | 6/2005 | Astarabadi |
| 2005/0139685 A1 | 6/2005 | Kozlay |
| 2005/0174953 A1 | 8/2005 | Ho |
| 2005/0177633 A1 | 8/2005 | Plunkett |
| 2006/0002312 A1 | 1/2006 | Delattre et al. |
| 2006/0061795 A1 | 3/2006 | Walmsley |
| 2006/0088021 A1 | 4/2006 | Nelson et al. |
| 2006/0091223 A1 | 5/2006 | Zellner |
| 2006/0114878 A1 * | 6/2006 | Choe ..................... H04W 74/02 370/346 |
| 2006/0145817 A1 | 7/2006 | Aikawa |
| 2006/0165024 A1 | 7/2006 | Iwami |
| 2006/0175420 A1 | 8/2006 | Satou |
| 2006/0184860 A1 | 8/2006 | Takagi |
| 2006/0205343 A1 | 9/2006 | Runyon |
| 2006/0219776 A1 | 10/2006 | Finn |
| 2006/0220867 A1 | 10/2006 | Dixon |
| 2007/0000316 A1 | 1/2007 | Lauer |
| 2007/0002892 A1 | 1/2007 | Waxman |
| 2007/0010928 A1 | 1/2007 | Brusarosco |
| 2007/0026891 A1 | 2/2007 | Lai |
| 2007/0058661 A1 | 3/2007 | Chow |
| 2007/0083697 A1 | 4/2007 | Birrell |
| 2007/0083924 A1 | 4/2007 | Lu |
| 2007/0099641 A1 | 5/2007 | Lastinger |
| 2007/0113636 A1 | 5/2007 | Huang |
| 2007/0125836 A1 | 6/2007 | McAllister et al. |
| 2007/0136509 A1 | 6/2007 | Agami |
| 2007/0183366 A1 | 8/2007 | Park |
| 2007/0211532 A1 | 9/2007 | Gonzalez |
| 2007/0232281 A1 | 10/2007 | Nakai |
| 2007/0254619 A1 | 11/2007 | Salomone |
| 2007/0295074 A1 | 12/2007 | Kobayakawa |
| 2008/0041936 A1 | 2/2008 | Vawter |
| 2008/0069097 A1 | 3/2008 | Motegi |
| 2008/0075123 A1 | 3/2008 | Fourcand |
| 2008/0107060 A1 | 5/2008 | Andou et al. |
| 2008/0121687 A1 | 5/2008 | Buhot |
| 2008/0123683 A1 | 5/2008 | Cheng |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Shoo et al. |
| 2008/0209322 A1 | 8/2008 | Kaufman |
| 2008/0219323 A1 | 9/2008 | Desai |
| 2008/0228592 A1 | 9/2008 | Kotas |
| 2008/0238621 A1 | 10/2008 | Rofougaran |
| 2008/0242279 A1 | 10/2008 | Ramer |
| 2008/0256409 A1 | 10/2008 | Oran et al. |
| 2008/0279210 A1 | 11/2008 | Naka |
| 2008/0302177 A1 | 12/2008 | Sinnett |
| 2008/0320139 A1 | 12/2008 | Fukuda |
| 2009/0003376 A1 | 1/2009 | Horvat |
| 2009/0006376 A1 | 1/2009 | Hendriks |
| 2009/0034491 A1 | 2/2009 | Adams |
| 2009/0055377 A1 | 2/2009 | Hedge |

(56) References Cited

U.S. PATENT DOCUMENTS

| | | |
|---|---|---|
| 2009/0069049 A1 | 3/2009 | Jain |
| 2009/0073070 A1 | 3/2009 | Rofougaran |
| 2009/0094501 A1 | 4/2009 | Jijina |
| 2009/0113267 A1 | 4/2009 | Harrison |
| 2009/0138948 A1 | 5/2009 | Calamera |
| 2009/0141531 A1 | 6/2009 | Abedin |
| 2009/0150646 A1 | 6/2009 | Allen |
| 2009/0171749 A1 | 7/2009 | Laruelle |
| 2009/0171947 A1 | 7/2009 | Karayel |
| 2009/0196279 A1 | 8/2009 | Kim |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0011156 A1 | 1/2010 | Yim |
| 2010/0026589 A1 | 2/2010 | Dou |
| 2010/0027558 A1 | 2/2010 | Han |
| 2010/0036806 A1 | 2/2010 | Lam |
| 2010/0052859 A1 | 3/2010 | Lossau |
| 2010/0075612 A1 | 3/2010 | Oi |
| 2010/0078471 A1 | 4/2010 | Lin |
| 2010/0082893 A1 | 4/2010 | Ma |
| 2010/0097946 A1 | 4/2010 | Celetano |
| 2010/0097956 A1 | 4/2010 | Tauil |
| 2010/0097957 A1 | 4/2010 | Pirzada et al. |
| 2010/0118737 A1 | 5/2010 | Kim |
| 2010/0124238 A1* | 5/2010 | Hong .................. H04W 74/04 370/474 |
| 2010/0162069 A1 | 6/2010 | Niu |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0232408 A1 | 9/2010 | Lim |
| 2010/0256976 A1 | 10/2010 | Atsmon |
| 2010/0261496 A1 | 10/2010 | Fukumoto |
| 2010/0280904 A1 | 11/2010 | Ahuja |
| 2010/0295681 A1 | 11/2010 | Burns et al. |
| 2010/0303051 A1 | 12/2010 | Umeuchi |
| 2010/0313241 A1 | 12/2010 | Lee |
| 2010/0329131 A1 | 12/2010 | Oyman |
| 2011/0003607 A1 | 1/2011 | Forenza et al. |
| 2011/0007733 A1 | 1/2011 | Kubler et al. |
| 2011/0029370 A1 | 2/2011 | Roeding |
| 2011/0064013 A1 | 3/2011 | Liu |
| 2011/0074552 A1 | 3/2011 | Norair |
| 2011/0099037 A1 | 4/2011 | Levin |
| 2011/0111766 A1 | 5/2011 | Yang |
| 2011/0112892 A1 | 5/2011 | Tarantino |
| 2011/0116513 A1 | 5/2011 | Gilson |
| 2011/0156872 A1 | 6/2011 | Wengrovitz |
| 2011/0191657 A1 | 8/2011 | Bliss |
| 2011/0223937 A1 | 9/2011 | Leppanen |
| 2011/0268024 A1 | 11/2011 | Jamp |
| 2011/0306384 A1 | 12/2011 | Wei |
| 2011/0316716 A1 | 12/2011 | Mackay |
| 2012/0001730 A1 | 1/2012 | Potyrailo |
| 2012/0039265 A1 | 2/2012 | Patel |
| 2012/0059936 A1 | 3/2012 | Bauchot |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0093151 A1 | 4/2012 | McFarland |
| 2012/0116694 A1 | 5/2012 | Norair |
| 2012/0116887 A1 | 5/2012 | Norair |
| 2012/0118952 A1 | 5/2012 | Norair |
| 2012/0136704 A1 | 5/2012 | Carlson |
| 2012/0191848 A1 | 7/2012 | Norair |
| 2012/0191901 A1 | 7/2012 | Norair |
| 2012/0201246 A1 | 8/2012 | Fernandez |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2013/0017788 A1 | 1/2013 | Norair |
| 2013/0210461 A1 | 8/2013 | Moldavsky |
| 2015/0009967 A1 | 1/2015 | Norair |

FOREIGN PATENT DOCUMENTS

| | | |
|---|---|---|
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and The Written Opinion of the International Searching Authority, or the Declaration, in International application No. PCT/US11/55082, dated Mar. 1, 2012 (13 pages).

PCT International Searching Authority, Notification Concerning Transmittal of the International Search Report and The Written Opinion of the International Searching Authority, or the Declaration, in International application No. PCT/US11/55934, dated Mar. 6, 2012 (11 pages).

PCT International Searching Authority, Notification Concerning Transmittal of the International Search Report and The Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and The Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and The Written Opinion of the International Searching Authority, or the Declaration, in International application No. PCT/US11/059304, dated Mar. 9, 2012 (11 pages).

PCT International Searching Authority, Notification Concerning Transmittal of the International Search Report and The Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and The Written Opinion of the International Searching Authority, or the Declaration, in International application No. PCT/US12/22005, dated Mar. 29, 2012. (12 pages).

PCT International Searching Authority, Notification Concerning Transmittal of the International Search Report and The Written Opinion of the International Searching Authority, or the Declaration, in International application No. PCT/US12/22002, dated May 8, 2012. (13 pages).

PCT International Searching Authority, Notification Concerning Transmittal of the International Search Report and The Written Opinion of the International Searching Authority, or the Declaration, in International application No. PCT/US2012/025191 dated May 25, 2012 (8 pages).

PCT International Searching Authority, Notification Concerning Transmittal of the International Search Report and The Written Opinion of the International Searching Authority, or the Declaration, in International application No. PCT/US2012/025197 dated May 25, 2012 (7 pages).

(56) References Cited

OTHER PUBLICATIONS

PCT International Searching Authority, Notification Concerning Transmittal of the International Search Report and The Written Opinion of the International Searching Authority, or the Declaration, in International application No. PCT/US2012/027382 dated May 31, 2012 (10 pages).

PCT International Searching Authority, Notification Concerning Transmittal of the International Search Report and The Written Opinion of the International Searching Authority, or the Declaration, in International application No. PCT/US2012/027381 dated May 31, 2012 (13 pages).

PCT International Searching Authority, Notification Concerning Transmittal of the International Search Report and The Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and The Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and The Written Opinion of the International Searching Authority, or the Declaration, in International application No. PCT/US2012/027379 dated Jun. 20, 2012 (16 pages).

PCT International Searching Authority, Notification Concerning Transmittal of the International Search Report and The Written Opinion of the International Searching Authority, or the Declaration, in International application No. PCT/US2012/027384 dated Jun. 20, 2012 (10 pages).

PCT International Searching Authority, Notification Concerning Transmittal of the International Search Report and The Written Opinion of the International Searching Authority, or the Declaration, in International application No. PCT/US2012/046894 dated Sep. 27, 2012.

PCT International Searching Authority, Notification Concerning Transmittal of the Int'l Report and The Written Opinion of the Int'l Searching authority or the Declaration in Int'l application No. PCT/US2012/027386 dated Oct. 16, 2012.

Norair JP (2009). Introduction to DASH7 Technologies 1 st Edition. Whitepaper. Mar. 16, 2009. 1-22.

Richard MacManus. DASH7: Bringing Sensor Networking to Smartphones. readwrite.com. Apr. 11, 2010. pp. 1-5.

Popovski, P. et al. "Device Discovery in Short Range Wireless Ad Hoc Networks," 5th Intl Symposium on Wireless Personal Multimedia Communications, vol. 3, Oct. 2002, pp. 27-30.

\* cited by examiner

METHOD AND APPARATUS FOR QUERY-BASED CONGESTION CONTROL

CLAIM OF PRIORITY

This patent application is a continuation of U.S. application Ser. No. 13/408,464, filed Feb. 29, 2012, now U.S. Pat. No. 8,885,586, which makes reference to, claims priority to and claims benefit from U.S. Provisional Patent Application Ser. No. 61/464,376 entitled "Advanced Communication System for Wide-area Low Power Wireless Applications and Active RFID" and filed on Mar. 2, 2011.

The above-referenced application is hereby incorporated herein by reference in its entirety.

INCORPORATION BY REFERENCE

This patent application also makes reference to:
U.S. Provisional Patent Application Ser. No. 61/464,376 titled "Advanced Communication System for Wide-Area Low Power Wireless Applications and Active RFID" and filed on Mar. 2, 2011;
U.S. Provisional Patent Application Ser. No. 61/572,390 titled "System for Adding Dash?-Based Applications Capability to a Smartphone" and filed on Jul. 15, 2011;
U.S. patent application Ser. No. 13/267,640 titled "Method and Apparatus for Adaptive Searching of Distributed Datasets" and filed on Oct. 6, 2011;
U.S. patent application Ser. No. 13/267,621 titled "Method and Apparatus for Low-Power, Long-Range Networking" and filed on Oct. 6, 2011;
U.S. Pat. No. 8,718,551 titled "Method and Apparatus for a Multi-band, Multi-mode Smartcard" and filed on Oct. 11, 2011;
U.S. patent application Ser. No. 13/270,959 titled "Method and Apparatus for an Integrated Antenna" and filed on Oct. 11, 2011;
U.S. patent application Ser. No. 13/289,054 titled "Method and Apparatus for Electronic Payment" and filed on Nov. 4, 2011;
U.S. patent application Ser. No. 13/289,050 filed on Nov. 4, 2011;
U.S. Pat. No. 8,622,312 titled "Method and Apparatus for Interfacing with a Smartcard" and filed on Nov. 16, 2011;
U.S. patent application Ser. No. 13/354,513 titled "Method and Apparatus for Memory Management" and filed on Jan. 20, 2012;
U.S. patent application Ser. No. 13/354,615 titled "Method and Apparatus for Discovering, People, Products, and/or Services via a Localized Wireless Network" and filed on Jan. 20, 2012;
U.S. patent application Ser. No. 13/396,708 titled "Method and apparatus for Plug and Play, Networkable ISO 18000-7 Connectivity" and filed on Feb. 15, 2012;
U.S. patent application Ser. No. 13/396,739 titled "Method and Apparatus for Serving Advertisements in a Low-Power Wireless Network" and filed on Feb. 15, 2012;
U.S. patent application Ser. No. 13/408,440 titled "Method and Apparatus for Forward Error Correction (FEC) in a Resource-Constrained Network" and filed on Feb. 29, 2012;
U.S. Pat. No. 8,867,370 titled "Method and Apparatus for Adaptive Traffic Management in a Resource-Constrained Network" and filed on Feb. 29, 2012;
U.S. patent application Ser. No. 13/408,453 titled "Method and Apparatus for Dynamic Media Access Control in a Multiple Access System" and filed on Feb. 29, 2012;
U.S. Pat. No. 8,774,096 titled "Method and Apparatus for Rapid Group Synchronization" and filed on Feb. 29, 2012;
U.S. patent application Ser. No. 13/408,461 titled "Method and Apparatus for Addressing in a Resource-Constrained Network" and filed on Feb. 29, 2012; and
U.S. patent application Ser. No. 13/408,466 titled "Method and Apparatus for Power Autoscaling in a Resource-Constrained Network" and filed on Feb. 29, 2012.

Each of the above stated applications is hereby incorporated herein by reference in its entirety.

FIELD OF THE INVENTION

Certain embodiments of the invention relate to networking. More specifically, certain embodiments of the invention relate to a method and apparatus for query-based congestion control.

BACKGROUND OF THE INVENTION

Existing methods of congestion control in wireless networks often result in inefficient use of bandwidth and/or power. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for query-based congestion control, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set {(x), (y), (z), (x, y), (x, z), (y, z), (x, y, z)}. As utilized herein, the terms "block" and "module" refer to functions than can be implemented in hardware, software, firmware, or any combination of one or more thereof. As utilized herein, the term "exemplary" means serving as a non-limiting example, instance, or illustration. As utilized herein, the terms "e.g.," and "for example," introduce a list of one or more non-limiting examples, instances, or illustrations.

Figure 1B:
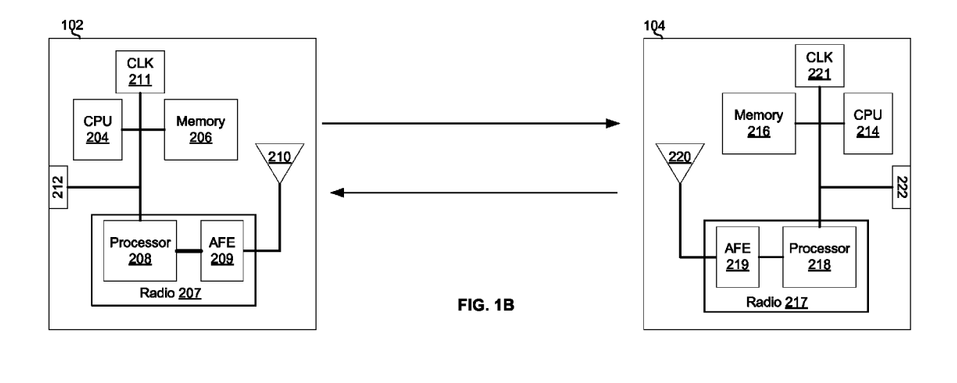
FIG. 1B depicts exemplary communication devices which may be operable to implement query-based congestion control.

FIG. 1 depicts exemplary communication devices which may be operable to implement query-based congestion control. Shown in FIG. 1 are details of an exemplary first device 102 and details of an exemplary second device 104.

The CPU 204 may comprise circuitry operable to control operation of the first device 102. The CPU 204 may, for example, execute an operating system and/or other programs such (e.g., programs that enable a user interface of the device 102). The CPU 204 may generate one or more control signals for controlling the operation of the device 102. The CPU 204 may, for example, control a mode of operation of the device 102.

The CPU 214 may comprise circuitry operable to control operation of the second device 104. In some instances, the CPU 214 may be substantially similar to the CPU 204. In instances that the device 102 is less resource-constrained device, such as a base station or network controller, and the device 104 is more resource-constrained device, such as a battery-powered tag, the CPU 204 may be less-complex (e.g., comprise fewer gates, utilize less power, utilize less memory, etc.) than the CPU 214. In one embodiment, for example, the CPU 204 may comprise a RISC or ARM processor, and the CPU 214 may comprise a state-machine having a relatively small number of states (e.g., four states).

The radio 207 may comprise a processor 208 and an analog front-end (AFE) 209. The processor 208 may comprise circuitry operable to interface with the AFE 209 to receive and transmit data, and to process received and to-be-transmitted data. For transmission, the processor 208 may be operable to receive data from the CPU 204 and/or memory 206, encode, packetize, and/or otherwise process the data to prepare it for transmission in accordance with one or more wireless protocols, and output the data to the AFE 209 for transmission. For reception, the processor 208 may be operable to receive data via the AFE 209, process the received data and output received data to the memory 206 and/or the CPU 204. Exemplary protocols which may be supported by the second device 104 include the ISO 18000-7 standard, and protocols described in the above-incorporated U.S. Provisional Patent Application No. 61/464,376 filed on Mar. 2, 2011.

The radio 217 may comprise a processor 218 and an analog front-end (AFE) 219. The baseband processor 218 may comprise circuitry operable to interface with the AFE 219 to receive and transmit data, and to process received and to-be-transmitted data. In some instances, the baseband processor 218 may be substantially similar to the baseband processor 208. In instances that the device 102 is less-resource-constrained device, such as a base station or network controller, and the device 104 is a more-resource-constrained device, such as a battery-powered tag, the baseband processor 218 may be less-complex (e.g., comprise fewer gates, utilize less power, utilize less memory, etc.) than the baseband processor 208. In one embodiment, for example, the baseband processor 208 may be operable to implement more complex signal processing algorithms (e.g., FEC decoding) than the baseband processor 218.

The analog front-end (AFE) 209 may comprise circuitry suitable for processing received and/or to-be-transmitted data in the analog domain. For transmission, the AFE 209 may receive digital data from the baseband processor 208, process the data to generate corresponding RF signals, and output the RF signals to the antenna 210. For reception, the AFE 209 may receive RF signals from the antenna 210, process the RF signals to generate corresponding digital data, and output the digital data to the baseband processor 209. In some instances, the AFE 219 may be substantially similar to the AFE 209. In instances that the device 102 is less-resource-constrained device, such as a base station or network controller, and the device 104 is a more-resource-constrained device, such as a battery-powered tag, the AFE 219 may be less-complex (e.g., comprise fewer gates, utilize less power, utilize less memory, etc.) than the AFE 209. In one embodiment, for example, the AFE 209 may comprise a more-sensitive receiver, a more powerful transmitter than the AFE 219.

Circuitry of the memory 206 may comprise one or more memory cells and may be operable to store data to the memory cell(s) and read data from the memory cell(s). The one or more memory cell may comprise one or more volatile memory cells and/or one or more non-volatile memory cells. The memory 206 may store data arranged, for example, as an indexed short file block (ISFB) and/or indexed short file series block (ISFSB) as described in the above-incorporated U.S. Provisional Patent Application 61/464,376.

Circuitry of the memory 216 may comprise one or more memory cells and may be operable to read data from the memory cell(s) and/or store data to the memory cell(s). The memory 216 may store data arranged, for example, as an indexed short file block (ISFB) and/or indexed short file series block (ISFSB) as described in the above-incorporated U.S. Provisional Patent Application 61/464,376. In some instances, the memory 216 may be substantially similar to the memory 206. In instances that the device 104 is resource-constrained, the memory 216 may be less-complex (e.g., comprise fewer gates, utilize less power, etc.) than the memory 206.

Each of the clocks 211 and 221 may be operable to generate one or more oscillating signals which may be utilized to control synchronous circuitry of the device 100. The clock 211 may comprise, for example, one or more crystal oscillators, phase-locked loops, and/or direct digital synthesizers. The clock 211 may also comprise a "date/time" or "real-time" clock operable to keep track of time of day, day of week, day of month, month, and/or year.

The interfaces 212 and 222 may enable configuring and/or programming the devices 102 and 104, respectively. In an exemplary embodiment, one or more values of one or more timing parameters may be programmed via the programming interfaces 212 and/or 222.

Each of the antennas 210 and 220 may be operable to transmit and receive electromagnetic signals in one or more frequency bands. In an embodiment of the invention, the antennas 210 and 220 may be operable to transmit and receive signals in the ISM frequency band centered at 433.92 MHz.

In operation, the device 102 may send a request message which may be received by the device 104. The request message may comprise an N-bit search token and one or more threshold values. The device 104 may then search N-bit blocks of data in the memory 216 looking for a "match" for the search token. Just how similar the N-bit data needs to be to the search token may be determined by the received threshold value. For example, if the threshold value is N, then only an N-bit block of data exactly matching the search token would be a "match." On the other hand, if the threshold value is 5, then any N-bit block of data in the memory that has 5 bits in common with the search token may be considered a "match." The number of bits that an N-bit block of data has in common with the search token may be referred to as that block's search score.

In an exemplary embodiment, if more one or more matches for the search token are found in the memory 216, then the device 104 may send a response message to the device 102. The device 104 may, for example, send one or more matching blocks of data, and/or the scores associated with the matching blocks, to the device 102. The device 104 may prioritize the data and/or scores it sends to the device 102 in order of highest to lowest search score.

In an exemplary embodiment, if, when, and/or how the device 104 sends a response message to the device 102 may be determined based on the search score(s) that resulted from the search of the memory 216 for the received search token. For example, the device 104 may not respond to the request if none of the search scores are above the threshold value. Conversely, if one or more of the search scores are above the threshold, how soon the device 104 attempts to send a response and/or how aggressively the device 104 contends for access to the communication medium may depend on the search score associated with the message to be sent. For example, for a response message containing data with a relatively-higher search score, the device 104 may begin contending for access to the medium almost immediately after generating the search score and may contend for access for a relatively-longer period. Conversely, a for a response message containing data with a search score of less than N, the device 104 may delay contending for the medium and, once it does start contending for the medium, may do so for a relatively-shorter period of time. Additionally or alternatively, for a response message containing data with a relatively-higher search score, the device 104 may require the medium to be free for a relatively-shorter period of time before it begins transmitting the response. Conversely, for a response message containing data with a relatively-shorter search score, the device 104 may require the medium to be free for a relatively-longer period of time before it begins transmitting the response.

Figure 2:
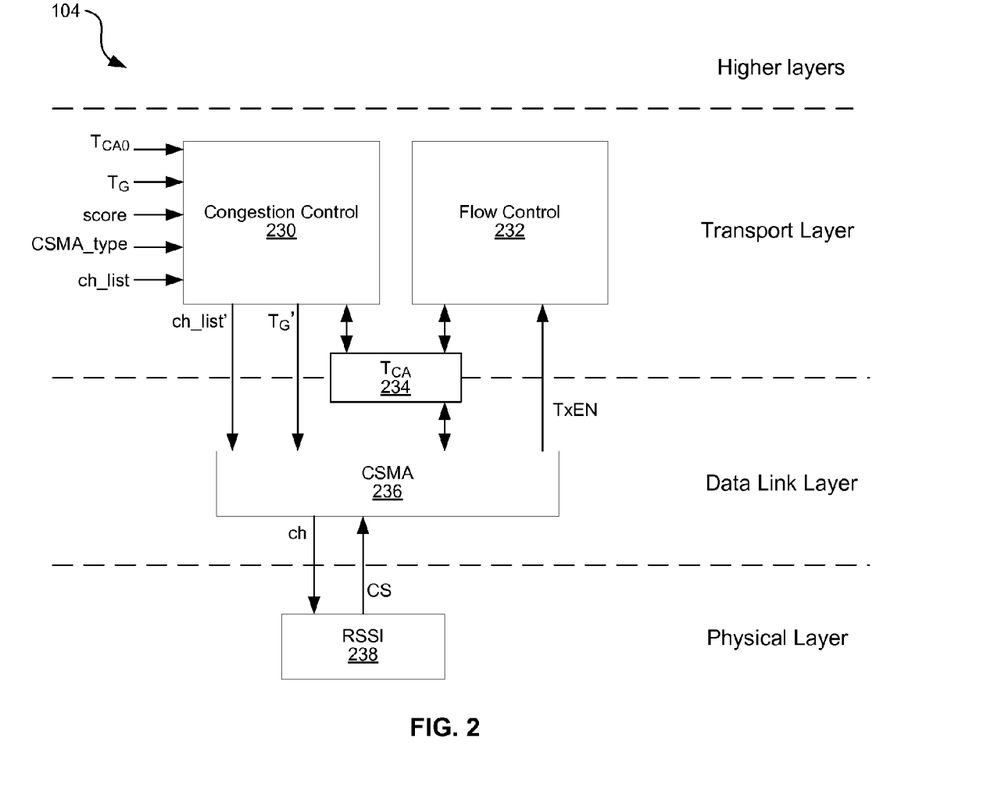
FIG. 2 is a diagram illustrating aspects of the invention taking place at different layers of the OSI model.

FIG. 2 is a diagram illustrating aspects of the invention taking place at different layers of the OSI model. As shown in FIG. 2, the device 104 may comprise: a congestion module 230 and/or a flow control module 232 which may operate at the transport layer (layer 4 of the OSI model); a carrier sense multiple access (CSMA) module 236 which may operate at the data link layer (layer 2 of the OSI model); and a received signal strength indicator (RSSI) module which may operate at the physical layer (layer 1 of the OSI model). The device 104 may also comprise a register 234 which may be accessible to and/or modifiable by the congestion control module 230, the flow control module 232, and/or the CSMA module 236.

In operation, the congestion control module 230 may receive timing parameters $T_{CA0}$, $T_G$, score, ch_list, and CSMA_options. The parameter $T_{CA0}$ may correspond to the amount of time that the device 104 has to initiate transmission of the response message. That is, $T_{CA0}$ may correspond to $T_C-T_{resp}$, where $T_C$ is the duration of the response window (the amount of time that the requesting device is going to listen for responses to the request message), and $T_{resp}$ is the amount of time it will take the device 104 to transmit the response message. The parameter $T_G$ may be an initial value for a parameter $T_G'$ which may determine how long the physical medium must be inactive before the device 104 begins transmitting on the medium. The parameter "score" may be the search score associated with the response message. The parameter ch_list may indicate onto which channel or channels the device 104 may attempt to transmit the response message. The congestion control module 230 may utilize ch_list to generate ch_lst' which may be, for example, all or a subset of ch_list. One or more of the parameters $T_C$, $T_G$, score, CSMA_options, and ch_list may have been received in, and/or derived from information contained in, the request message. In this manner, the requesting device may control, at least in part, if, how, and/or when the responding device 104 transmits a response to the request.

The parameter CSMA_options may indicate whether to use carrier sense (i.e. "listen before talk") and/or which equations and/or algorithms are utilized by the congestion control module 230 for calculating $T_{CA}$ and/or $T_G'$. For example, for a first value of CSMA_options, $T_{CA}$ may be set equal to $T_{CA0}$, but for a second CSMA_options, $T_{CA}$ may be set equal to $T_{CA0}/2$. In this regard, the congestion control module 230 may utilize the parameters $T_{CA0}$, score, ch_list and/or CSMA_options to generate a value of $T_{CA}$, which may be less than or equal to $T_{CA0}$. After calculating $T_{CA}$, the congestion control module 230 may store the value of $T_{CA}$ in the register 234. Similarly, the congestion control module 230 may utilize the parameters $T_G$, score, ch_list and/or CSMA_options for calculating $T_G'$.

Upon initialization from the congestion control module 230, the CSMA module 236 may perform CSMA as, for example, described below in reference to FIG. 4B. If an available channel is detected, the CSMA module 236 may assert TxEN and the congestion control module 204 may then manage the transmission of the response packet onto the medium on the available channel. Upon TxEN being asserted, the flow control module 232 may modify the value stored in the register 234. If, after trying for a period of time $T_{CA}$, none of the channels in the channel list are determined to be available, then, depending on the value of $T_{CA}$, the device 104 may abort transmission of the response or may take a break and try again later. For example, if the congestion control module sets $T_{CA}=T_{CA0}$ then upon the CSMA failing to obtain access to the medium for a period of time $T_{CA}$, the device 104 may abort transmission of the response message. Conversely, if $T_{CA}<T_{CA0}$, then the congestion control module 230 may wait for a period of time $T_{wait}$, and then trigger the CSMA module 236 to once again attempt to gain access to the medium. The second attempt may last for up to period of time equal to $T_{CA0}-T_{CA}-T_{wait}$. The parameter $T_{wait}$ may be calculated based on, for example, the parameters score, CSMA_options, $T_{CA0}$, $T_{CA}$, $T_G$, and/or $T_G'$.

Figure 3:
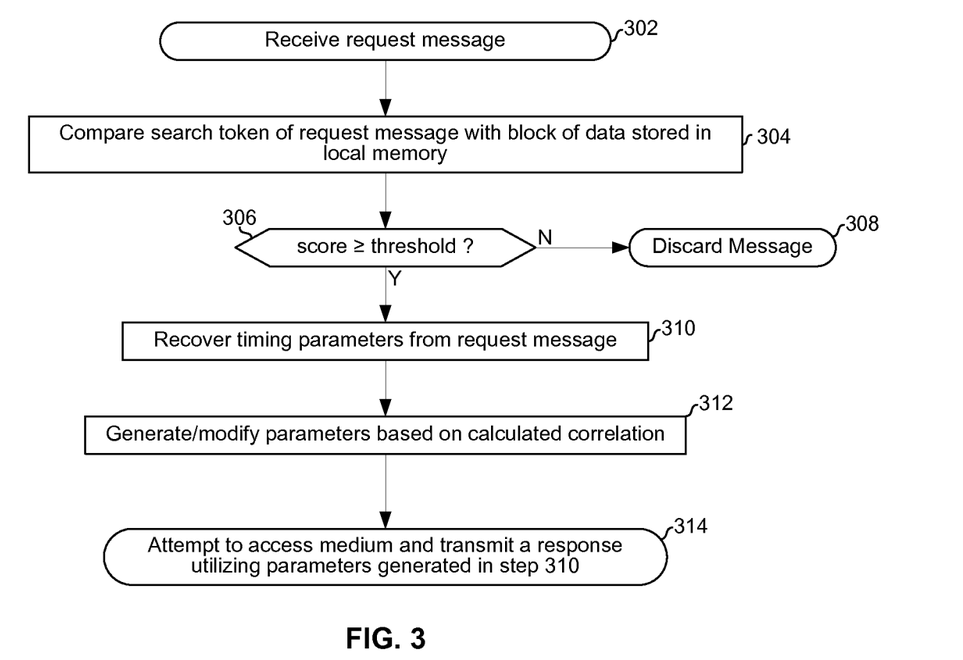
FIG. 3 is a flowchart illustrating exemplary steps for query-based congestion control.

FIG. 3 is a flowchart illustrating exemplary steps for query-based congestion control. In step 302, the device 104 may receive a request message from the device 102. In step 304, the device 104 may compare a search token contained in the request message to a block of data stored in the memory 216. The result of the comparison may be a score which indicates the similarity between the search token and the block of data. In an exemplary embodiment, the score may be generated via a correlation operation. In step 306, the score generated in step 304 may be compared to a threshold value. The threshold value may, for example, have been received in the request message and/or pre-configured in the device 104. If the score is below the threshold, then, in step 308, the device 104 may decide to discard the request and not send a response. If the score is above the threshold value, then the exemplary steps may advance to step 310.

In step 310, the device 104 may extract one or more timing parameters (e.g., one or more of the parameters $T_C$, $T_G$, CSMA_options, and ch_list discussed above with respect to FIG. 2) from the request message. In step 312, the device 104 may calculate one or more timing parameters based on the score generated in step 304 and/or based on the parameters recovered in step 310. The device 104 may, for example, calculate $T_{CA}$ and $T_G'$ as described above with respect to FIG. 2.

Figure 4A:
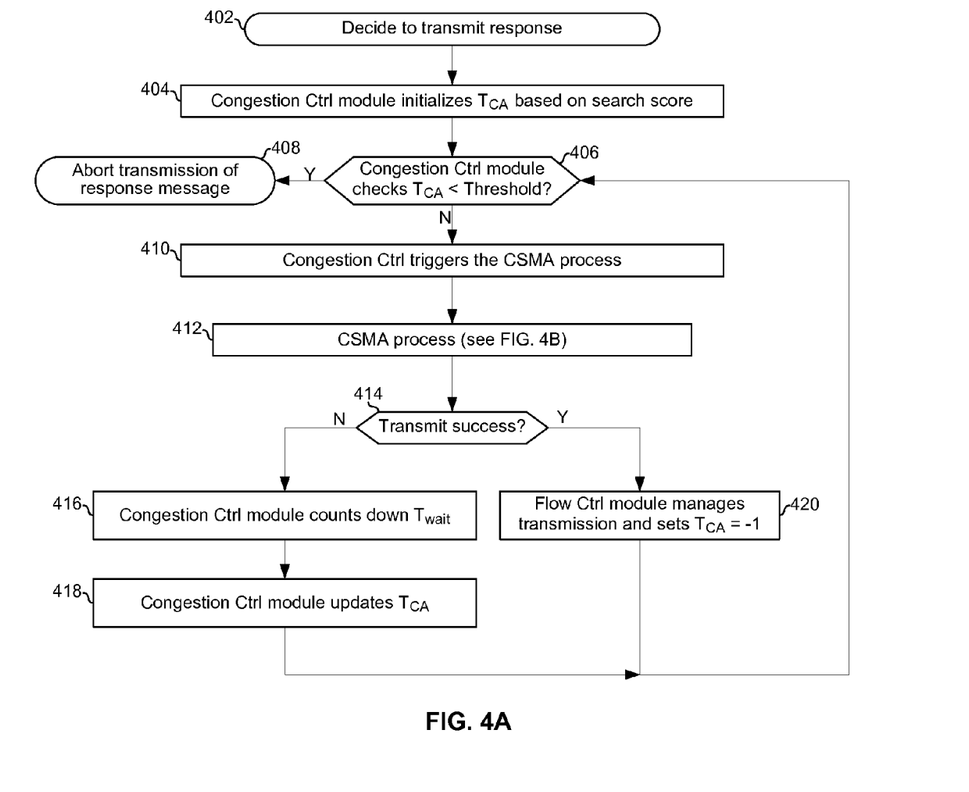
FIGS. 4A and 4B are a flowchart illustrating the use of carrier sense multiple access (CSMA) for implementing query-based congestion control.
Figure 4B:
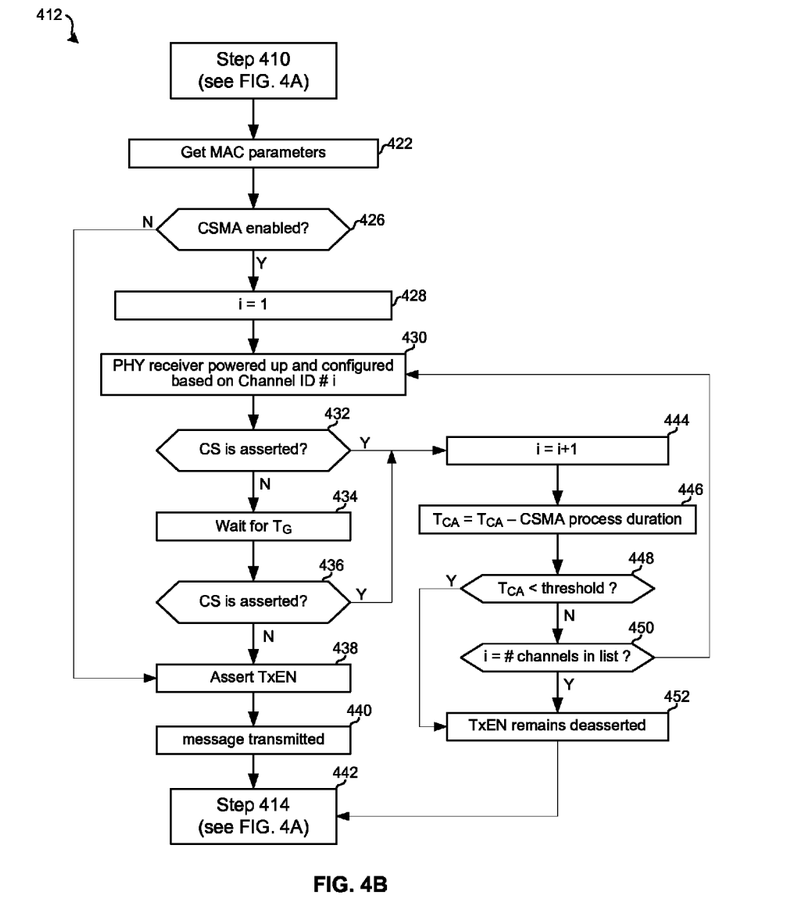

FIGS. 4A and 4B are a flowchart illustrating the use of carrier sense multiple access (CSMA) for implementing query-based congestion control. Referring to FIG. 4A, the exemplary steps begin with step 402 in which the device 104 decides to respond to a received request message. In step 404, the congestion control module calculates a value of $T_{CA}$ based on a search score associated with the response message to be transmitted and/or based on one or more other timing parameters. The calculated value of $T_{CA}$ may then be stored to the register 234. In step 406, the congestion control module 230 may compare the value of $T_{CA}$ to a threshold. If the value of $T_{CA}$ is less than a threshold (i.e., the requesting device will cease listening before the complete response message can be transmitted) then in step 408, the device 104 may abort transmission of the response message.

Returning to step 406, if the value of $T_{CA}$ is greater than the threshold, then, in step 410, the congestion control module 230 triggers the CSMA process performed by the CSMA module 236. In step 412, the CSMA process described below with respect to FIG. 4B may take place. In step 414, if transmission was successful (i.e., either CSMA was disabled or an available channel for transmitting the response message was detected during step 412), then the exemplary steps may advance to step 420. In step 420, the flow control module 232 may set the $T_{CA}$ register 234 to a value guaranteed to be less than the threshold utilized in step 408. For example, the flow control module 232 may set the $T_{CA}$ register 234 to a value of −1.

Returning to step 414, if the step 412 did not result in a successful transmission, then the exemplary steps may advance to step 416. In step 416, the congestion control module may count down an amount of time $T_{wait}$. The value of $T_{wait}$ may be calculated based on variety of parameters such as, for example, described above with respect to FIG. 2. In step 418, the value stored in the $T_{CA}$ register 234 may be updated. In an exemplary embodiment, the value stored in the register 234 may be updated by subtracting off the amount of time that has elapsed since the value was calculated. In another exemplary embodiment, a new value of $T_{CA}$ may be calculated based on one or more timing parameters, such as those described with respect to FIG. 2, and/or based on how much time is left in the response window (the time period of duration $T_C$ during which the requesting device will listen for responses).

Referring now to FIG. 4B, in step 422, the CSMA module 236 may retrieve one or more parameters from the congestion control module 230 and/or retrieve the value of $T_{CA}$ from the register 234. In step 426, if CSMA is disabled (i.e., the device 104 is configured to transmit onto the medium without first sensing whether another device is currently transmitting) then the steps advance to step 438. In step 438, the CSMA module 236 asserts TxEN. In step 440 the message is transmitted by the flow control module 232.

Returning to step 426, if CSMA is enabled, then in step 428, a variable I may be set to 1. In step 430, the physical layer receiver of the device 104 may be powered-up and configured to receive on the $i^{th}$ channel identified by the parameter ch_list'. In step 432, the CSMA module 236 may detect whether CS from the physical layer receiver is asserted. The PHY may assert CS when the received signal strength is above a threshold. The threshold utilized by the RSSI module 238 may have been pre-configured by an administrator and/or configured dynamically based on, for example, past performance and/or based on information contained in the received request message. If CS is not asserted, then in step 434, the CSMA module 236 waits for a period of time equal to $T_G'$. In step 436, the CSMA module 236 again detects whether CS from the physical layer receiver is asserted. If CS is not asserted then, in step 438 the CSMA module 236 asserts TxEN. In step 440 the flow control module 232 manages the transmission of the response message onto the physical medium.

Returning to steps 432 and 436, if either of these steps detect that CS is asserted, then the exemplary steps advance to step 444. In step 444, the variable i is incremented by 1. In step 446, the value of $T_{CA}$ in register 236 is updated by subtracting off the amount of time that has elapsed since the register was last programmed. In step 448, the updated value of $T_{CA}$ is compared to a threshold (i.e. it is determined whether there would still be time to transmit the response message before the contention period ends). If $T_{CA}$ is less than the threshold, then in step 452, TxEN remains deasserted and the steps advance to step 442. If $T_{CA}$ is greater than or equal to the threshold, then in step 450 it is determined whether all channels in the channel list have been checked for availability. If not, then the exemplary steps return to step 430. If all channels have been checked, then the exemplary steps advance to step 452.

Figure 4C:
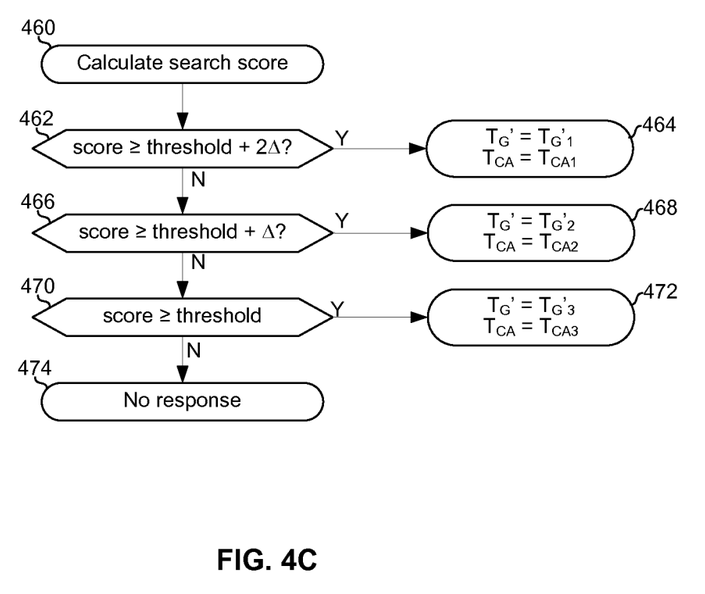
FIG. 4C is a flowchart illustrating query-based calculation of timing parameters for accessing a shared medium.

FIG. 4C is a flowchart illustrating query-based calculation of timing parameters for accessing a shared medium. The exemplary steps begin with step 460 after the device 104 has received a request message and is calculating a search score based on a search token received in the request message. In step 462, the device 104 may determine whether the search score is greater than a threshold plus a margin $2*\Delta$. If so, then in step 464, the congestion control module 230 may set $T_G'$ to $T_{G'1}$ and set $T_{CA}$ to $T_{CA1}$.

Returning to step 462, if the search score is not greater than threshold $+2\Delta$, then the steps advance to step 466. In step 466, the device 104 may determine whether the search score is greater than a threshold plus a margin $\Delta$. If so, then in step 468, the congestion control module 230 may set $T_G'$ to $T_{G'2}$ (where $T_{G'2} > T_{G'1}$) and set $T_{CA}$ to $T_{CA2}$ (where $T_{CA2} < T_{CA1}$).

Returning to step 466, if the search score is not greater than threshold $+\Delta$, then the steps advance to step 470. In step 470, the device 104 may determine whether the search score is greater than the threshold. If so, then in step 472, the congestion control module 230 may set $T_G'$ to $T_{G'3}$ (where $T_{G'3} > T_{G'2}$) and set $T_{CA}$ to $T_{CA3}$ (where $T_{CA3} < T_{CA}$). Returning to step 470, if the search score is not greater than threshold, then the steps advance to step 474 and no response maybe transmitted.

Figure 5A:
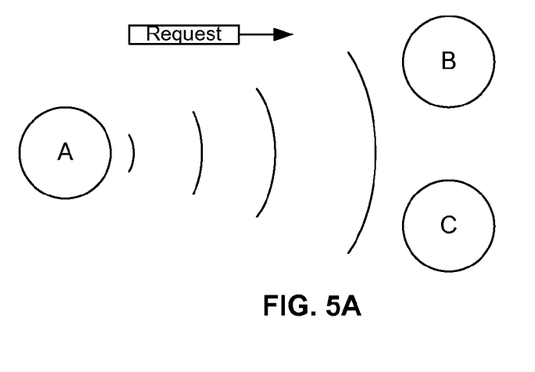
FIGS. 5A-5E illustrate an exemplary dialog between network devices utilizing query-based congestion control.
Figure 5B:
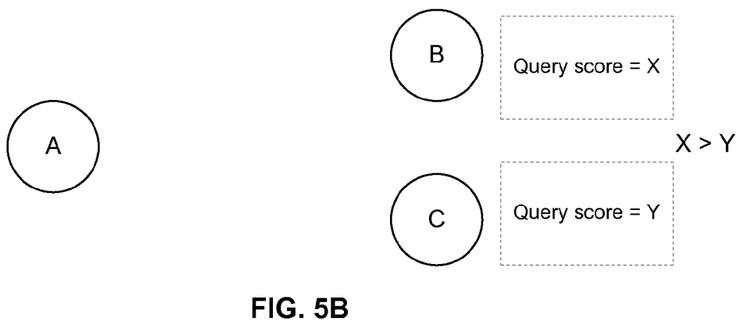
Figure 5C:
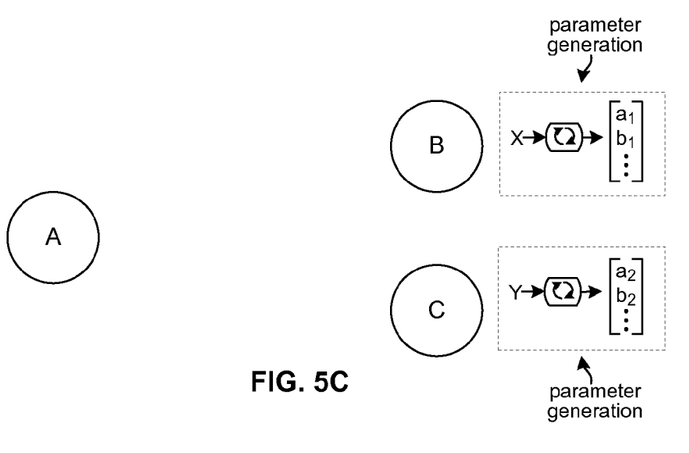
Figure 5D:
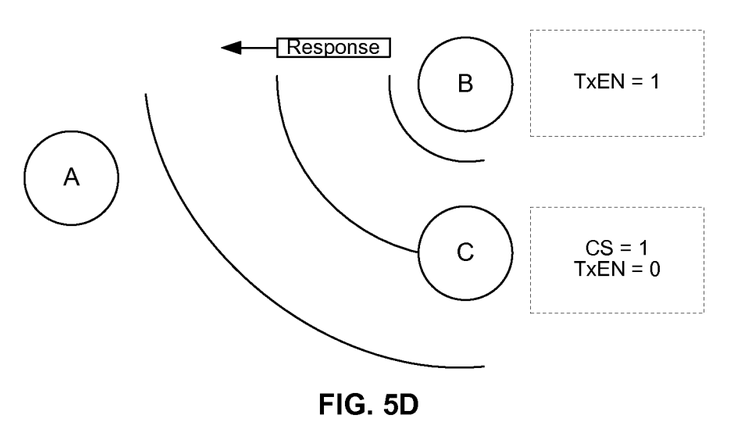
Figure 5E:
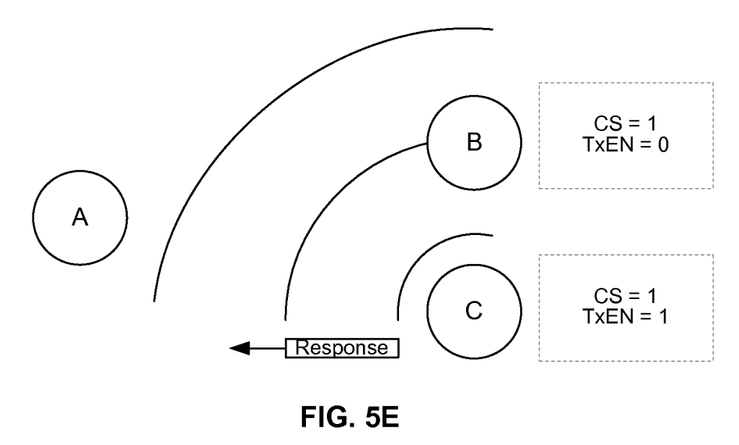

FIGS. 5A-5E illustrate an exemplary dialog between network devices utilizing query-based congestion control. In FIG. 5A, the device A is shown transmitting a request message which is received by both devices B and C. In FIG. 5B the device B may calculate a search score of X and the device C may calculate a search score of Y, where X is a higher search score than Y. In FIG. 5C, the device B may generate timing parameters based on the search score X and the device C may generate timing parameters based on the search score Y. In FIG. 5D, based on the parameters generated in FIG. 5C, the device B may gain access to the medium before the device C gains access to the medium. Accordingly, the device B may transmit a response while the device C holds off transmitting its lower-scored response. Then, in FIG. 5E, the device C may transmit its response message.

In an exemplary embodiment of the invention, the electronic device 104 may comprise an interface (e.g., radio 207) operable to communicate over a physical medium and may be operable to regulate the transmission of a message onto the physical medium. The device 104 may access the medium in accordance with a carrier sense multiple access (CSMA) scheme, wherein one or more values of one or more CSMA parameters (e.g., ch_list, score, TG, TCA0, and/or CSMA_options) may be determined based on the result of a comparison of a received search token to data stored in the communication device. The message may be a response to a request message received via the communication interface, and the search token may have been received in the request message. A result of the comparison may be a score that indicates how similar the data is to the search token. One or more values of the one or more CSMA parameters may be determined based on the result of a comparison of the score and one or more thresholds. The one or more thresholds may have been received in the request message. The one or more values of the one or more of the CSMA parameters may be determined based on one or more initial values of the one or more CSMA parameters contained in the received request message.

The CSMA parameters may comprise a first parameter (e.g., TCA) corresponding to an amount of time that the device attempts to access the medium. An equation utilized for determining the first parameter may be selected from a plurality of equations based on the comparison of the data stored in the communication device and the search token. A relatively-higher similarity between the data and the search token may result in relatively-higher value of the first parameter, and a relatively-lower similarity between the data and the search token may result in a relatively-lower value of the first parameter. Additionally or alternatively, the CSMA parameters may comprise a second parameter corresponding to an amount of time that the medium must be free before transmitting the message onto the medium. A relatively-higher similarity between the data and the search token may result in relatively-lower value of the second parameter, and a relatively-lower similarity between the data and the search token may result in a relatively higher-value of the second parameter.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for query-based congestion control.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in an electronic device comprising a communication interface for communicating over a physical medium:
   receiving a first message over said physical medium;
   setting, based on a result of a comparison between a user-entered search token in said first message and data stored in said electronic device, a value of a first carrier sense multiple access (CSMA) parameter that determines an amount of time that said physical medium must be free before said electronic device can transmit a response to said first message; and
   transmitting a response message onto said physical medium in accordance with said determined first CSMA parameter.

2. The method of claim 1, wherein:
   said result of said comparison is a score that indicates how similar said data is to said search token;
   said setting of said value of said first CSMA parameter is based on the result of a comparison between said score and one or more thresholds received in said first message.

3. The method of claim 1, wherein:
   said setting of said value of said first CSMA parameter is based on one or more initial values of said first CSMA parameter received in said first message.

4. The method of claim 1, comprising setting, based on said result of said comparison, a value of a second CSMA parameter that determines an amount of time that said electronic device attempts to access said medium for transmission of a response to said first message.

5. The method of claim 4, comprising selecting an equation to utilize for said setting said value of said second CSMA parameter based on said result of said comparison.

6. The method of claim 4, comprising:
   when there is relatively-higher similarity between said data and said search token, setting said value of said second CSMA parameter to a first value; and
   when there is relatively-lower similarity between said data and said search token, setting said value of said second CSMA parameter to a second value, wherein said first value is larger than said second value.

7. The method of claim 1, comprising:
   when there is relatively-higher similarity between said data and said search token, setting said value of said first CSMA parameter to a first value; and
   when there is relatively-lower similarity between said data and said search token, setting said value of said first CSMA parameter to a second value, wherein said first value is smaller than said second value.

8. A system comprising:
an electronic device comprising a communication interface for communicating over a physical medium, said electronic device being operable to:
  receive a first message over said physical medium;
  set, based on a result of a comparison between a user-entered search token in said first message and data stored in said electronic device, a value of a first carrier sense multiple access (CSMA) parameter that determines an amount of time that said physical medium must be free before said electronic device can transmit a response to said first message; and
  transmit a response message onto said physical medium in accordance with said determined first CSMA parameter.

9. The system of claim 8, wherein:
said result of said comparison is a score that indicates how similar said data is to said search token;
said set of said value of said first CSMA parameter is based on the result of a comparison between said score and one or more thresholds received in said first message.

10. The system of claim 8, wherein:
said setting of said value of said first of said CSMA parameter is based on one or more initial values of said first CSMA parameters received in said first message.

11. The system of claim 8, wherein said electronic device sets, based on said result of said comparison, a value of a second CSMA parameter that determines an amount of time that said electronic device attempts to access said medium for transmission of a response to said first message.

12. The system of claim 11, wherein said electronic device selects an equation to utilize for said set of said value of said second CSMA parameter based on said result of said comparison.

13. The system of claim 11, wherein said electronic device:
when there is relatively-higher similarity between said data and said search token, sets said value of said second CSMA parameter to a first value; and
when there is relatively-lower similarity between said data and said search token, sets said value of said second CSMA parameter to a second value, wherein said first value is larger than said second value.

14. The system of claim 8, wherein said electronic device:
when there is relatively-higher similarity between said data and said search token, sets said value of said first CSMA parameter to a first value; and
when there is relatively-lower similarity between said data and said search token, sets said value of said first CSMA parameter to a second value, wherein said first value is smaller than said second value.

* * * * *